United States Patent
Yoo (10) Patent No.: US 10,266,348 B1
(45) Date of Patent: Apr. 23, 2019

(54) CONVEYOR BELT CLEANING APPARATUS

(71) Applicant: SJE Corporation, Ltd., Busan (KR)

(72) Inventor: Ho Moog Yoo, Busan (KR)

(73) Assignee: SJE CORPORATION, LTD., Busan (KR)

(*) Notice: Subject to any disclaimer, the term of this patent is extended or adjusted under 35 U.S.C. 154(b) by 0 days.

(21) Appl. No.: 16/134,280

(22) Filed: Sep. 18, 2018

(30) Foreign Application Priority Data

Mar. 16, 2018 (KR) .................. 10-2018-0030792

(51) Int. Cl.
- *B65G 45/12* (2006.01)
- *B65G 45/18* (2006.01)
- *B65G 45/26* (2006.01)
- *B65G 45/22* (2006.01)

(52) U.S. Cl.
CPC ............ *B65G 45/22* (2013.01); *B65G 45/12* (2013.01); *B65G 45/18* (2013.01); *B65G 45/26* (2013.01)

(58) Field of Classification Search
CPC ......... B65G 45/22; B65G 45/26; B65G 45/18
USPC ...................... 198/495, 496, 493
See application file for complete search history.

(56) References Cited

U.S. PATENT DOCUMENTS

| | | | | |
|---|---|---|---|---|
| 2,266,309 A | * | 12/1941 | Cohen .................. | B65G 45/22 198/495 |
| 2,491,401 A | * | 12/1949 | Tucker .................. | B65G 45/18 15/256.5 |
| 6,135,267 A | * | 10/2000 | Straub .................. | B07B 1/55 198/495 |
| 6,364,959 B1 | * | 4/2002 | Straub .................. | B65G 45/22 100/151 |
| 6,575,290 B2 | * | 6/2003 | Loning .................. | B08B 9/28 198/494 |
| 9,096,392 B1 | * | 8/2015 | Barragan .............. | B65G 45/22 |
| 2006/0037169 A1 | * | 2/2006 | Sanders ................ | A61L 2/02 15/302 |
| 2015/0053531 A1 | * | 2/2015 | Pentzien, Sr. ......... | B65G 45/22 198/495 |
| 2015/0298915 A1 | * | 10/2015 | Handy .................. | B65G 45/22 198/495 |

FOREIGN PATENT DOCUMENTS

| | | |
|---|---|---|
| KR | 100863066 | 10/2008 |
| KR | 101162267 | 7/2012 |

\* cited by examiner

*Primary Examiner* — James R Bidwell
(74) *Attorney, Agent, or Firm* — Cantor Colburn LLP (57) ABSTRACT

Provided is a conveyor belt cleaning apparatus, and particularly, to a steam conveyor belt cleaning apparatus which is installed above a conveyor belt and configured to remove foreign substances adhering to the conveyor belt. Provided is a structure of the cleaning apparatus capable of cleanly cleaning, sterilizing, and washing a surface of the conveyor belt by spraying steam to separate foreign substances attached to the surface of the conveyor belt, collecting the foreign substances in a direction toward a foreign substance discharge unit, discharging the foreign substances, and clearly removing the foreign substances. As described above, the cleaning apparatus for removing finely protruding residues, which are foreign substances adhering to the surface of the conveyor belt, and sterilizing and washing the surface of the conveyor belt, such that the surface of the conveyor belt may be cleanly maintained.

4 Claims, 10 Drawing Sheets

CONVEYOR BELT CLEANING APPARATUS

TECHNICAL FIELD

The present invention relates to a conveyor belt cleaning apparatus, and particularly, to a steam conveyor belt cleaning apparatus which is installed above a conveyor belt and configured to remove foreign substances adhering to the conveyor belt.

BACKGROUND ART

A conveyor refers to a mechanical device that automatically and continuously conveys materials or freight over a predetermined distance in factories or the like. The types of conveyors include a belt conveyor, a screw conveyor, a chain conveyor, and the like. The belt conveyor refers to a device for continuously conveying items by placing the items on a belt made of rubber, woven fabric, iron meshes, steel plates, or the like and circulating the belt. The belt engages with belt wheels and operates in an endless manner, and the belt operates by rotating the belt wheels by an electric motor.

In general, most of the conveyor belts, which convey items, food, and the like, are contaminated due to foreign substances trapped on surfaces thereof when the conveyor belts are used over a long period of time, and as a result, it is necessary to remove the foreign substances.

It is necessary to essentially remove a source of contamination from the surface of the conveyor belt while washing and sterilizing the surface of the conveyor belt used in companies such as companies with the hazard analysis and critical control point (HACCP) certification that need to manage food hygiene.

Korean Patent No. 10-0863066 discloses an exemplary embodiment of a means for removing foreign substances.

That is, a conveyor belt cleaner in the related art includes: multiple scrapers 20a, 20b, 20c, . . . which each have a pair of fitting holes 22a and 22b penetratively formed at both sides at a predetermined interval, tips 23a and 23b formed at both sides, and a friction damping unit 26 positioned at a center therein; two wires 30a and 30b which are fitted with the pair of fitting holes 22a and 22b formed in each of the multiple scrapers 20a, 20b, 20c, . . . and positioned and fixed to be wound around a surface of a conveyor belt 60 that rotates on pulleys 50; wire fixing pieces 32 which are positioned at one end of the two wires 30a and 30b and support the wires 30a and 30b; and a tightening means which is fitted with the other end of the wires 30a and 30b and formed to push the multiple scrapers 20a, 20b, 20c, . . . toward one end, in which discharge holes 100 are formed each of the multiple scrapers 20a, 20b, 20c, . . . in a thickness direction.

In the related art configured as described above, there is a problem in that foreign substances are not perfectly discharged during a process of separating the foreign substances from the surface and discharging the foreign substances, and the foreign substances remain, which degrades work efficiency.

DOCUMENT OF RELATED ART

Patent Document (Patent Literature 1) Korean Patent No. 10-0863066 (Oct. 6, 2008)

(Patent Literature 2) Korean Patent No. 10-1162267 (Jun. 27, 2012)

SUMMARY OF THE INVENTION

The problems to be solved by the present invention are as follows.

The present invention has been made in an effort to provide a cleaning apparatus for removing finely protruding residues, which are foreign substances adhering to a surface of a conveyor belt, in order to cleanly maintain the surface of the conveyor belt.

The present invention has also been made in an effort to provide a structure of the cleaning apparatus capable of cleanly cleaning the surface of the conveyor belt by spraying steam to separate foreign substances attached to the surface of the conveyor belt, collecting the foreign substances in a direction toward a foreign substance discharge unit, discharging the foreign substances, and then clearly removing the foreign substances.

The present invention has also been made in an effort to maintain the surface of the conveyor belt in a more hygienic and stable state by cleanly cleaning the conveyor belt and sterilizing and washing the conveyor belt by using high-temperature steam.

To solve the aforementioned problems, the present invention provides a conveyor belt cleaning apparatus including: a steam chamber unit 110 which is seated on a surface of a conveyor belt 200, has a predetermined internal space formed to receive steam introduced from the outside, and a portion which is opened and faces the surface of the conveyor belt 200; a suction chamber unit 120 which is positioned at a rear side of the steam chamber unit 110, has a predetermined internal space, and has a portion which is opened and faces the surface of the conveyor belt 200; a foreign substance brush unit 130 which is positioned at a front lower side of the steam chamber unit 110, has one end seated on the conveyor belt 200, and sweeps foreign substances off the conveyor belt 200; a partition wall 140 which is positioned between the steam chamber unit 110 and the suction chamber unit 120, and has a foreign substance passing portion 141 formed at a lower end of the partition wall 140 so that foreign substances introduced into the steam chamber unit 110 are moved to the suction chamber unit 120; a steam injection port 150 which is positioned at one side in the steam chamber unit 110 in order to inject steam into an internal space of the steam chamber unit 110, and has one side that protrudes from a surface of the steam chamber unit 110; a foreign substance discharge unit 160 which penetrates one side of the suction chamber unit 120, and discharges the foreign substances introduced into the internal space of the suction chamber unit 120; and air suction ports 170 which are formed at both sides of the suction chamber unit 120 based on a center of the foreign substance discharge unit 160 so that air is introduced from the outside. The conveyor belt cleaning apparatus may further include a pressing unit 180 which is positioned at a rear side of the suction chamber unit 120, and has a squeegee 181 formed at a portion that is in contact with the conveyor belt 200. The steam injection port 150 may include: a steam injection pipe 151 which penetrates the steam chamber unit 110 so that one side of the steam injection pipe 151 is positioned outside the steam chamber unit 110 and connected to a portion into which the steam is injected, and the other side of the steam injection pipe 151 is positioned inside the steam chamber unit 110; a first connecting pipe 152 which extends toward both sides from an end of the steam injection pipe 151 positioned inside the steam chamber unit 110; and a second connecting pipe 153 which is elongated to pass through one side end and the other side end of the first connecting pipe 152, and has multiple steam discharge ports 153a formed in a direction toward the conveyor belt 200.

The present invention has the following effects.

The surface of the conveyor belt is quickly cleaned and sterilized and washed with high-temperature steam by using the cleaning apparatus of the present invention, and as a result, productivity is improved and the hygienic surface of the conveyor belt is ensured. In addition, according to the present invention, a series of processes of removing foreign substances, sterilizing and washing the surface of the conveyor belt to ensure the hygienic surface of the conveyor belt, and collecting and discharging foreign substances are continuously performed, and as a result, an operator need not separately remove foreign substances, thereby improving work efficiency.

EXPLANATION OF REFERENCE NUMERALS

1: Foreign substances
100: Cleaning apparatus
110: Steam chamber unit
111: First space portion
120: Suction chamber unit
121: Second space portion
130: Foreign substance brush unit
130a: Foreign substance brush cut-out portion
140: Partition wall
141: Foreign substance passing portion
141a: Foreign substance passing port
142: Convex foreign substance passing portion
142a: Convex portion
150: Steam injection port
151: Steam injection pipe
152: First connecting pipe
153: Second connecting pipe
153a: Steam discharge port
160: Foreign substance discharge unit
170: Air suction port
180: Pressing unit
181: Squeegee
200: Conveyor belt
300: Support unit
310: First apparatus fixing unit
320: Second apparatus fixing unit
330: First support
340: Second support
350: Third support
360: Fourth support
370: Fifth support

DETAILED DESCRIPTION

Hereinafter, exemplary embodiments of the present invention will be described in detail with reference to the accompanying drawings.

Figure 1:
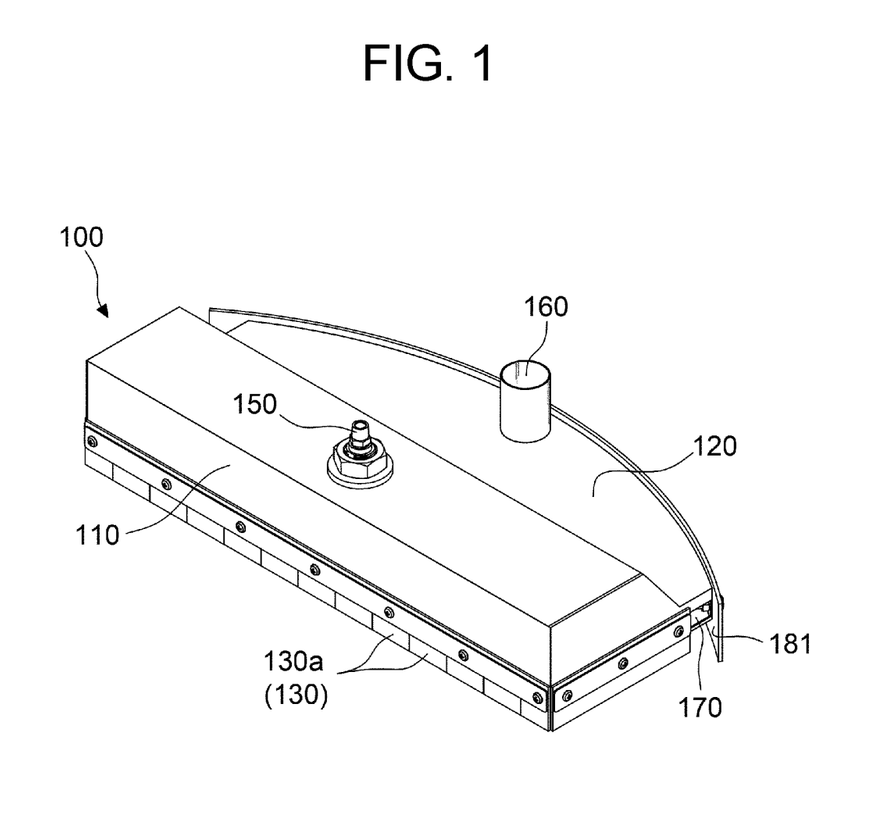
FIG. 1 is a view illustrating an entire appearance of a cleaning apparatus of the present invention.

FIG. 1 is a view illustrating an entire appearance of a conveyor belt cleaning apparatus (hereinafter, referred to as a cleaning apparatus) of the present invention. Referring to FIG. 1, a cleaning apparatus 100 of the present invention is configured to remove foreign substances attached to a surface of a conveyor belt 200 and sterilize and wash the surface of a conveyor belt 200. Specifically, the cleaning apparatus 100 is positioned above the conveyor belt 200. The conveyor belt 200 is moved toward the cleaning apparatus 100 positioned at one position in a state in which the conveyor belt 200 operates, thereby removing foreign substances attached to the surface of the conveyor belt 200 and sterilizing and washing the surface of the conveyor belt 200.

An operating process of the cleaning apparatus 100 will be briefly described. The cleaning apparatus 100 sweeps and moves foreign substances attached to the surface of the conveyor belt 200 into a steam chamber unit 110, and then sprays steam toward the conveyor belt 200 to detach the foreign substances from the surface of the conveyor belt 200, such that the foreign substances separated from the surface of the conveyor belt are moved to a suction chamber unit 120 and the foreign substances are discharged through a foreign substance discharge unit 160, thereby cleanly cleaning the conveyor belt 200.

Because the steam chamber unit 110 sprays high-temperature steam in a state in which a separate room is formed, and as a result, it is possible to wash the surface of the conveyor belt while continuously maintaining a high temperature in the room and thus to always maintain a sterilized and cleaned state.

Figure 2:
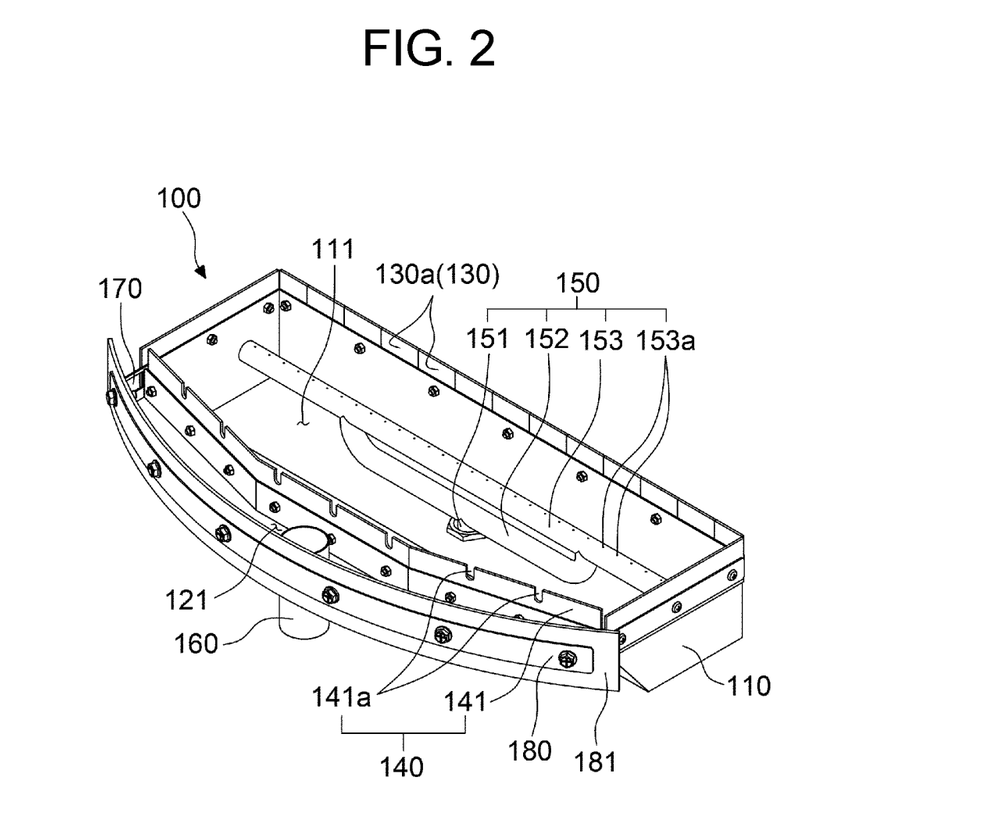
FIG. 2 is a view illustrating a reversed state of the cleaning apparatus of the present invention.

Referring to FIGS. 1 and 2, the cleaning apparatus 100 of the present invention includes the steam chamber unit 110, the suction chamber unit 120, a foreign substance brush unit 130, a partition wall 140, a steam injection port 150, the foreign substance discharge unit 160, an air suction port 170, and a pressing unit 180.

The respective constituent elements of the cleaning apparatus 100 of the present invention will be described in detail.

The steam chamber unit 110 is formed to receive steam introduced from the outside and has a predetermined internal space, that is, a first space portion 111.

In addition, the steam chamber unit 110 is seated on the surface of the conveyor belt 200 and a portion of the steam chamber unit 110, which faces the surface of the conveyor belt 200, is opened.

A high-temperature state may be maintained by spraying steam in a state in which the first space portion 111 of the steam chamber unit 110 is closed, and as a result, it is possible to quickly detach foreign substances from the surface of the conveyor belt 200 and simultaneously sterilize and wash the surface of the conveyor belt 200.

The suction chamber unit 120 is positioned at a rear side of the steam chamber unit 110 and has a predetermined internal space, that is, a second space portion 121. A portion of the suction chamber unit 120, which faces the surface of the conveyor belt 200, is opened.

The steam chamber unit 110 and the suction chamber unit 120 will be specifically described with reference to FIGS. 2 and 3. The steam injection port 150 is installed in the steam chamber unit 110, and a predetermined interval needs to be maintained between steam discharge ports 153a and the surface of the conveyor belt 200 so that steam is uniformly sprayed from the steam discharge ports 153a formed in a second connecting pipe 153 of the steam injection port 150. Particularly, an appropriate interval is formed between the steam discharge ports 153a and the surface of the conveyor belt 200 to sterilize and wash the surface of the conveyor belt with steam, and the interval may be appropriately adjusted in accordance with spray pressure of steam sprayed from the steam discharge ports 153a, the type of the conveyor belt, and a state of foreign substances.

The suction chamber unit 120 needs to have a minimum internal space so that foreign substances passing through the steam chamber unit 110 are maximally rapidly and quickly discharged. An interval between a lower end of the foreign substance discharge unit 160 and the surface of the conveyor belt 200 is small, and air suction ports 170 are formed at both ends of the suction chamber unit 120, such that the interior of the foreign substance discharge unit 160 does not become a vacuum state, and as a result, the suction chamber unit 120 may smoothly suction the foreign substances from the surface of the conveyor belt 200.

A volume v1 of the first space portion 111 of the steam chamber unit 110 may be larger than a volume v2 of the second space portion 121 of the suction chamber unit 120 (v1>v2) so that the aforementioned process of smoothly detaching the foreign substances from the surface of the conveyor belt 200 and then discharging the foreign substances is smoothly performed.

That is, the configuration is devised based on the Bernoulli's theorem using pressure resulting from the nature of a fluid moving from a wide location to a narrow location. Since the steam chamber unit 110 has a greater size and height than the suction chamber unit 120, a fluid speed is low but internal pressure is high in the steam chamber unit 110. Since pressure is low but a fluid speed is high in the suction chamber unit 120, foreign substances positioned in the steam chamber unit 110 are moved to the suction chamber unit 120 and then discharged through the foreign substance discharge unit 160.

The foreign substance brush unit 130 is positioned at a front lower side of the steam chamber unit 110 and configured to sweep foreign substances off the conveyor belt 200. The foreign substance brush unit 130 is elongated along a front lower end of the steam chamber unit 110 and cut to form multiple foreign substance brush cut-out portions 130a each having a predetermined width.

In addition, the foreign substance brush unit 130 may be formed as one piece elongated along the front lower end of the steam chamber unit 110 and may have the multiple foreign substance brush cut-out portions 130a formed at a lower end thereof.

Figure 3:
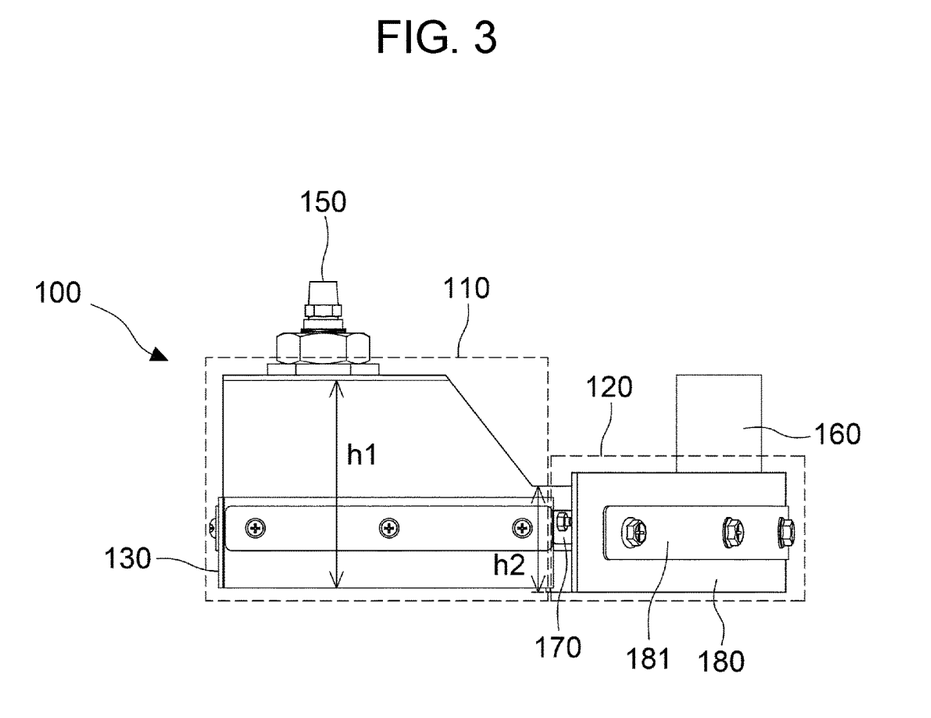
FIG. 3 is a view illustrating a lateral side of the cleaning apparatus of the present invention.

The front side of the steam chamber unit 110 means the left side where the foreign substance brush unit 130 is positioned when viewing FIG. 3.

Since the foreign substance brush unit 130 has the multiple foreign substance brush cut-out portions 130a, the foreign substance brush unit 130 may serve as a broom to sweep and move foreign substances such as finely protruding residues on the surface of the conveyor belt. The foreign substance brush unit 130 may be made of a soft material such as rubber.

The partition wall 140 is positioned between the steam chamber unit 110 and the suction chamber unit 120 to define the steam chamber unit 110 and the suction chamber unit 120, and the partition wall 140 has a foreign substance passing portion 141 formed at a lower side of the partition wall 140 so that foreign substances introduced into the steam chamber unit 110 pass through the foreign substance passing portion 141 to the suction chamber unit 120.

The foreign substance passing portion 141 has a predetermined number of foreign substance passing ports 141a at predetermined intervals in a direction toward the conveyor belt 200, and foreign substances move to the suction chamber unit 120 from the steam chamber unit 110 while passing through the foreign substance passing ports 141a.

The foreign substance passing port 141a only has a minimum hole through which the foreign substances pass so that the interior state of the steam chamber unit 110 and the interior state of the suction chamber unit 120 do not affect each other.

The partition wall 140 may have a shape curved in a direction toward the steam chamber unit 110 and in a direction away from the foreign substance discharge unit 160 based on the foreign substance discharge unit 160 formed at one side of the suction chamber unit 120. With the curved shape of the partition wall 140 as described above, foreign substances, which have moved from the steam chamber unit 110 to the suction chamber unit 120, are collected in the direction toward the foreign substance discharge unit 160 and then discharged through the foreign substance discharge unit 160.

Figure 5:
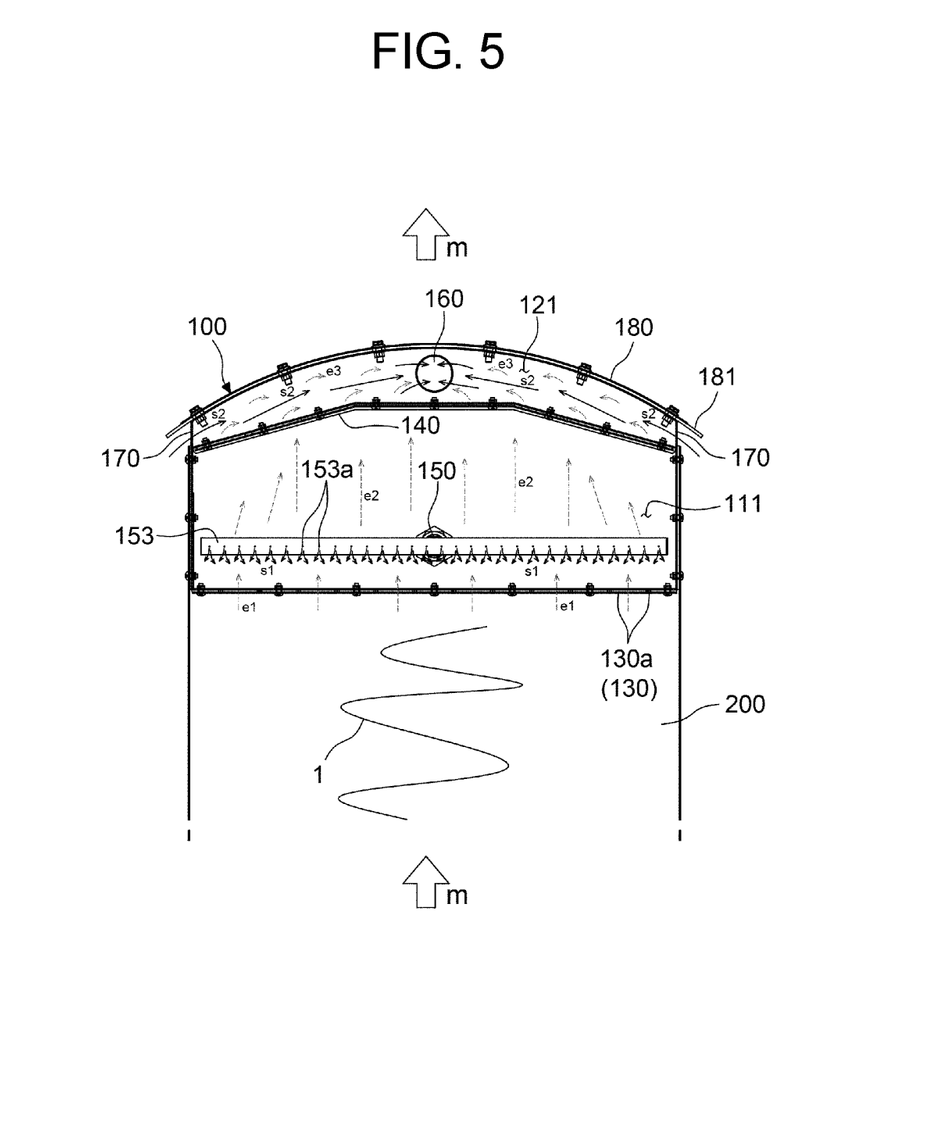

Particularly, when the foreign substance discharge unit 160 is formed at a center of an upper side of the suction chamber unit 120, the partition wall 140 is curved toward lower sides at one side and the other side based on the foreign substance discharge unit 160, that is, in a direction toward a front side of the steam chamber unit 110, such that foreign substances are moved and discharged from both sides toward the position of the foreign substance discharge unit 160 (see FIG. 5).

The steam injection port 150 is penetratively formed at one side of the steam chamber unit 110 and configured to inject steam into an internal space of the steam chamber unit 110.

That is, the steam injection port 150 is positioned at one side in the steam chamber unit 110 to inject steam into the internal space of the steam chamber unit 110, and one side of the steam injection port 150 protrudes from a surface of the steam chamber unit 110. The steam injection port 150 includes a steam injection pipe 151, a first connecting pipe 152, and the second connecting pipe 153.

The steam injection pipe 151 penetrates the steam chamber unit 110 so that one side of the steam injection pipe 151 is positioned outside the steam chamber unit 110 and connected to a portion into which the steam is injected, and the other side of the steam injection pipe 151 is positioned inside the steam chamber unit 110.

The first connecting pipe 152 extends toward both sides from an end of the steam injection pipe 151 positioned inside the steam chamber unit 110.

The second connecting pipe 153 is elongated to pass through one side end and the other side end of the first connecting pipe 152 and has the multiple steam discharge ports 153a formed in the direction toward the conveyor belt 200.

The second connecting pipe 153 has a smaller width than the suction chamber unit 120 in a direction corresponding to a width of the conveyor belt 200, and the multiple steam discharge ports 153a are formed at predetermined intervals from one side end to the other side end of the second connecting pipe 153, such that the steam may be uniformly sprayed to the surface of the conveyor belt 200.

The multiple steam discharge ports 153a are formed at predetermined intervals so as to be directed toward the surface of the conveyor belt 200, and the interval between the conveyor belt 200 and the steam discharge ports 153a is adjusted to uniformly spray the steam to the surface of the conveyor belt 200 when spraying the steam from the steam discharge ports 153a.

The steam is sprayed from the steam discharge ports 153a directly to the surface of the conveyor belt 200, such that the surface of the conveyor belt 200 is smoothly cleaned, sterilized, and washed.

The foreign substance discharge unit 160 penetrates one side of the suction chamber unit 120 and is configured to discharge foreign substances introduced into the internal space of the suction chamber unit 120. The foreign substance discharge unit 160 is formed in the form of a pipe and connected to an external discharge pipe to suck air in the suction chamber unit 120, thereby discharging foreign substances through the foreign substance discharge unit 160.

An appropriate interval needs to be formed between the foreign substance discharge unit 160 and the surface of the conveyor belt 200 in order to rapidly and quickly discharge foreign substances. The foreign substance discharge unit 160 needs to be installed at a height at which the conveyor belt 200 itself is not sucked upward by suction force exerted by the foreign substance discharge unit 160.

The air suction ports 170 are formed at both sides of the suction chamber unit 120 based on the foreign substance discharge unit 160 so that outside air is introduced.

The air suction ports 170 guide a flow of air so that the outside air introduced through the air suction port 170 flows to the foreign substance discharge unit 160, such that foreign substances are also moved toward the foreign substance discharge unit 160, and the foreign substances may be collected at the center of the foreign substance discharge unit 160 and then smoothly sucked. This configuration will be described specifically with reference to the exemplary embodiment illustrated in FIGS. 4 and 5.

The pressing unit 180 is positioned at a rear side of the suction chamber unit 120 and has a squeegee 181 formed at a portion that is in contact with the conveyor belt 200. The pressing unit 180 serves to wipe the surface of the conveyor belt 200 once more after foreign substances are discharged through the foreign substance discharge unit 160, and the pressing unit 180 also serves to seal an interior from the outside to enable a suction flow path to be formed in the air suction port 170.

The squeegee 181 of the pressing unit 180 slightly presses the surface of the conveyor belt 200, thereby preventing foreign substances from leaking to the outside. Particularly, when the foreign substance discharge unit 160 is positioned at the center of the upper side of the suction chamber unit 120, the pressing unit 180 is curved toward the lower sides of one side and the other side at the center of the foreign substance discharge unit 160, that is, in the direction toward the steam chamber unit 110, and a width between the partition wall 140 and the pressing unit 180 is gradually decreased toward both sides based on the foreign substance discharge unit 160, such that foreign substances are moved to be collected toward the position of the foreign substance discharge unit 160 and then discharged through the foreign substance discharge unit 160 (see FIG. 5).

A process of cleaning the surface of the conveyor belt 200 will be described with reference to FIGS. 4 and 5.

Figure 4:
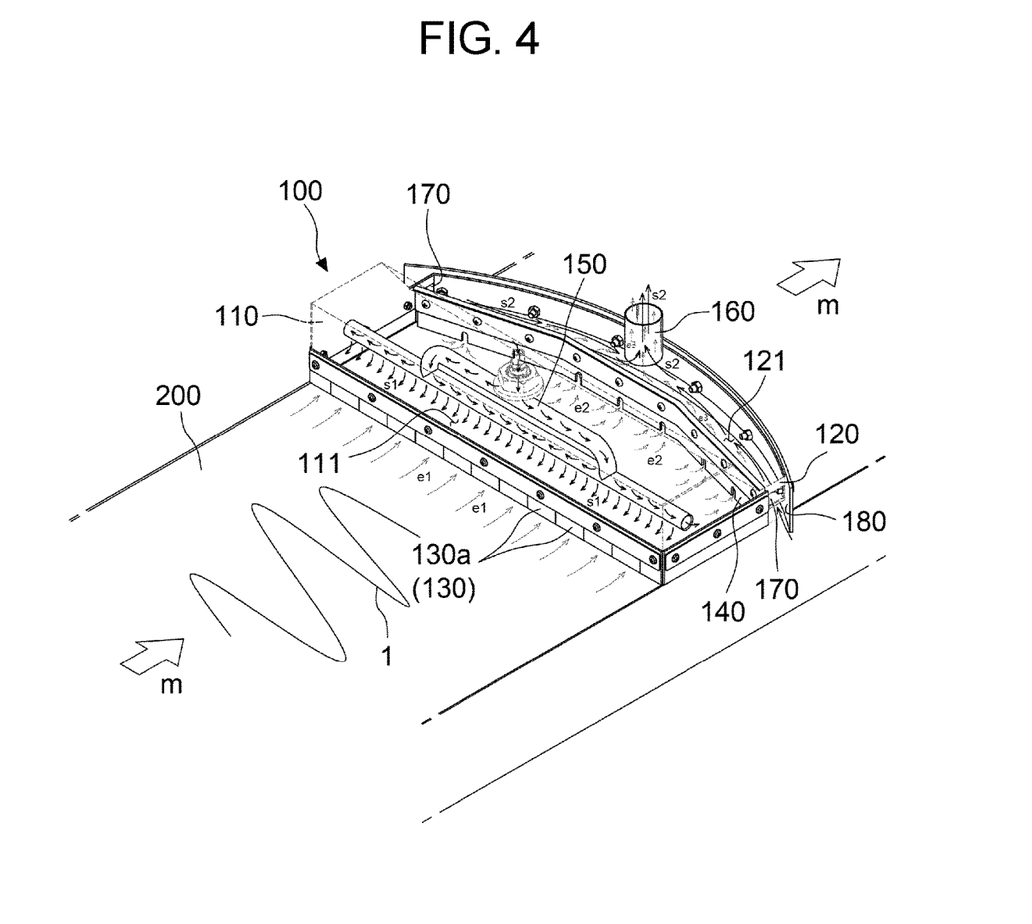
FIGS. 4 and 5 are views illustrating an example in which the cleaning apparatus of the present invention is used.

FIG. 4 is a view illustrating a state in which the cleaning apparatus 100 is positioned above the conveyor belt 200. In addition, FIG. 4 briefly illustrates the conveyor belt 200 and omits a steam injection unit which is positioned outside the cleaning apparatus 100 and connected to the steam injection port 150 to inject steam into the steam injection port 150, a pipe which is connected to the foreign substance discharge unit 160 and sucks foreign substances, a vacuum cleaner, and a guide which supports the cleaning apparatus 100 so that the cleaning apparatus 100 is positioned above the conveyor belt 200.

Referring to FIGS. 4 and 5, the conveyor belt 200 operates and moves in a conveyor belt operation direction m, foreign substances 1 attached to the surface of the conveyor belt 200 are moved in a direction e1 toward the foreign substance brush unit 130 and then moved to the steam chamber unit 110 by being swept by the foreign substance brush unit 130, and steam injected into the steam injection port 150 is sprayed in a steam spray direction s1 through the steam discharge ports 153a and then sprayed to the surface of the conveyor belt 200. The foreign substances attached to the surface of the conveyor belt 200 is detached from the surface of the conveyor belt 200 by the steam sprayed to the surface of the conveyor belt 200, and the detached foreign substances are moved in a direction e2 toward the foreign substance passing portion 141 and pass through the foreign substance passing ports 141a.

The foreign substances received in the suction chamber unit 120 is sucked and discharged by the foreign substance discharge unit 160. In this case, outside air flows in an air inflow direction s2 through the air suction ports 170 and guides an air flow toward the foreign substance discharge unit 160, such that the foreign substances are also moved in a direction e3 toward the foreign substance discharge unit and then sucked upward to the foreign substance discharge unit 160.

Figure 6:
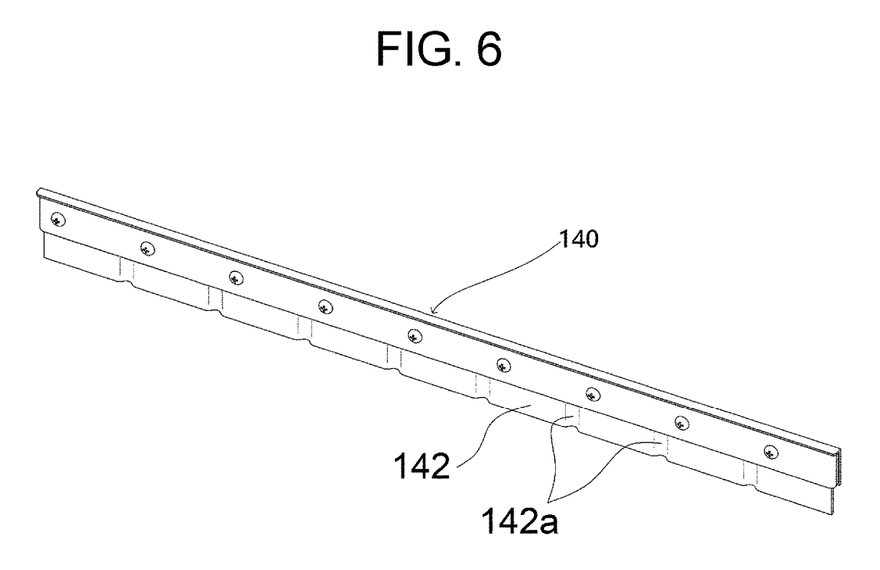
FIGS. 6 and 7 are views illustrating another exemplary embodiment of the cleaning apparatus of the present invention.
Figure 7:
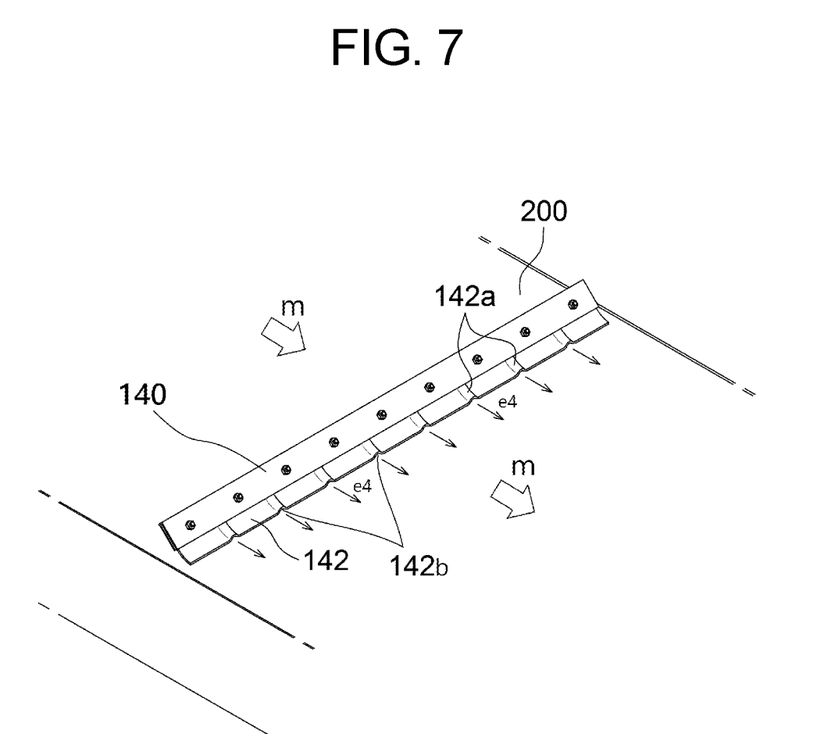

FIGS. 6 and 7 illustrate another exemplary embodiment of the present invention. A convex foreign substance passing portion 142 may be formed instead of the foreign substance passing portion 141 positioned at the lower side of the partition wall 140.

FIG. 6 simply illustrates only a shape of the convex foreign substance passing portion 142 positioned at the lower side of the partition wall 140. The convex foreign substance passing portion 142 is positioned at the lower side of the partition wall 140 and has a predetermined number of convex portions 142a formed at predetermined intervals.

The convex portion 142a is elongated in a direction perpendicular to the ground surface so that one side of the convex portion 142a has a groove and the other side of the convex portion 142a convexly protrudes. The portion having the groove is directed toward a front side of the steam chamber unit 110, and the convexly protruding portion is directed toward the suction chamber unit 120.

FIG. 7 illustrates an exemplary embodiment for explaining the motion of the convex foreign substance passing portion 142 when the conveyor belt 200 operates. As illustrated in FIG. 7, when the conveyor belt 200 moves in the conveyor belt operation direction m, a portion where the convex foreign substance passing portion 142 is in contact with the conveyor belt 200, is also pushed in the conveyor belt operation direction m and bent in a curved manner as illustrated in FIG. 7, such that a lower end of the convex portion 142a is lifted up. In this case, a passing groove 142b, which is a vacant space, is formed between the lower end of the convex portion 142a and the conveyor belt 200, and foreign substances are discharged in a foreign substance movement direction e4 through the passing groove 142b.

As described above, foreign substances attached to the surface of the conveyor belt 200 are removed by the cleaning apparatus 100 of the present invention, such that the conveyor belt 200 may be cleanly managed.

Figure 8:
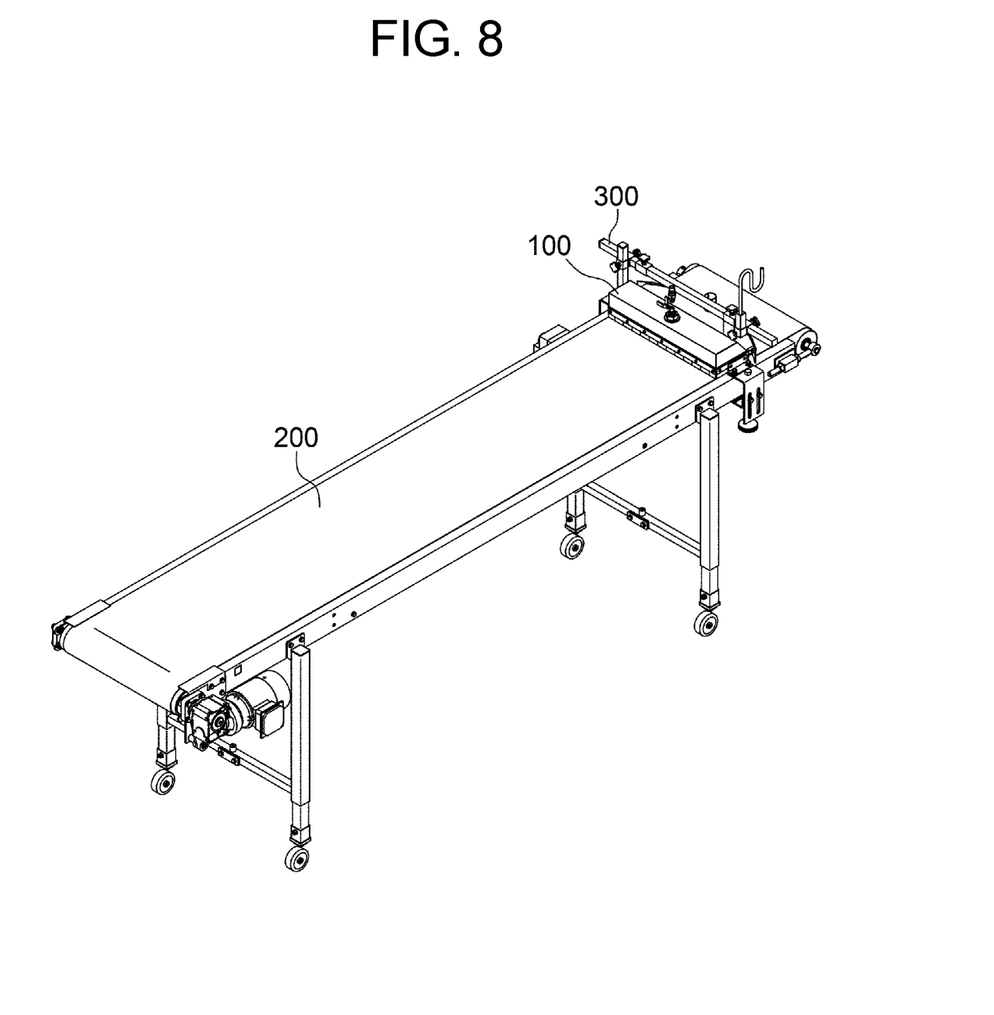
FIGS. 8, 9, and 10 are views illustrating a state in which the cleaning apparatus of the present invention is installed above a conveyor belt.

FIG. 8 is a view entirely illustrating a state in which the cleaning apparatus 100 of the present invention is positioned above the surface of the conveyor belt 200. A support unit 300 is additionally formed to position the cleaning apparatus 100 above the conveyor belt 200.

Figure 9:
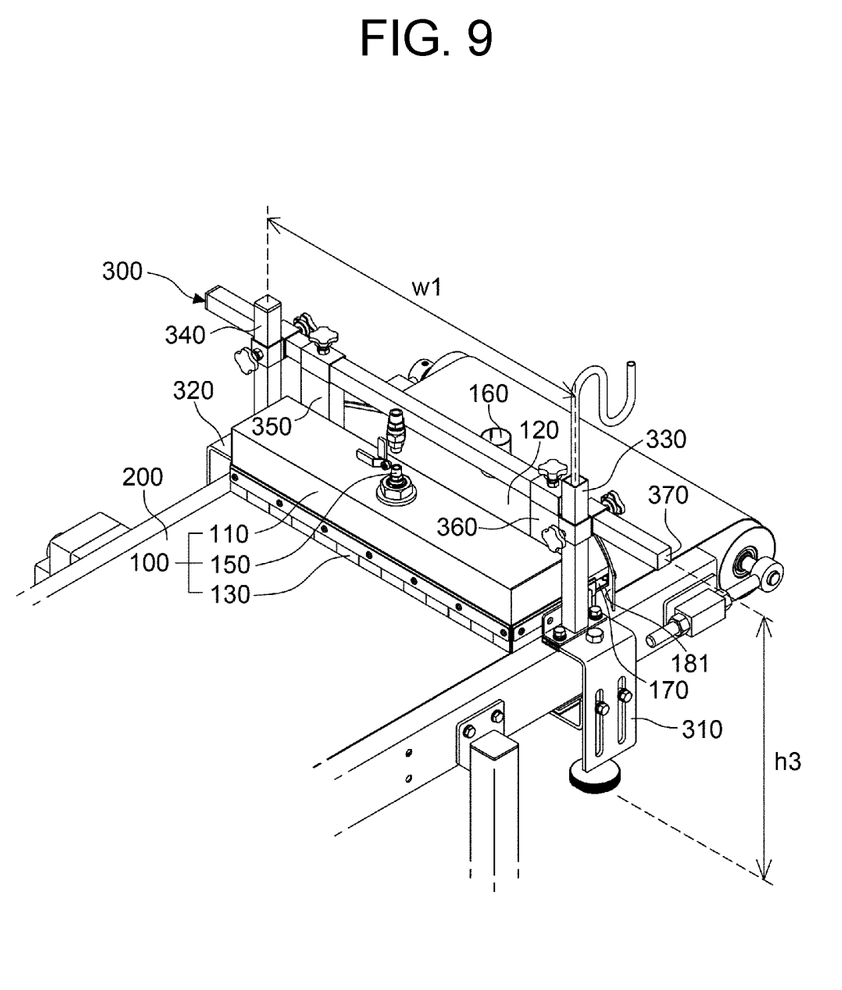
Figure 10:
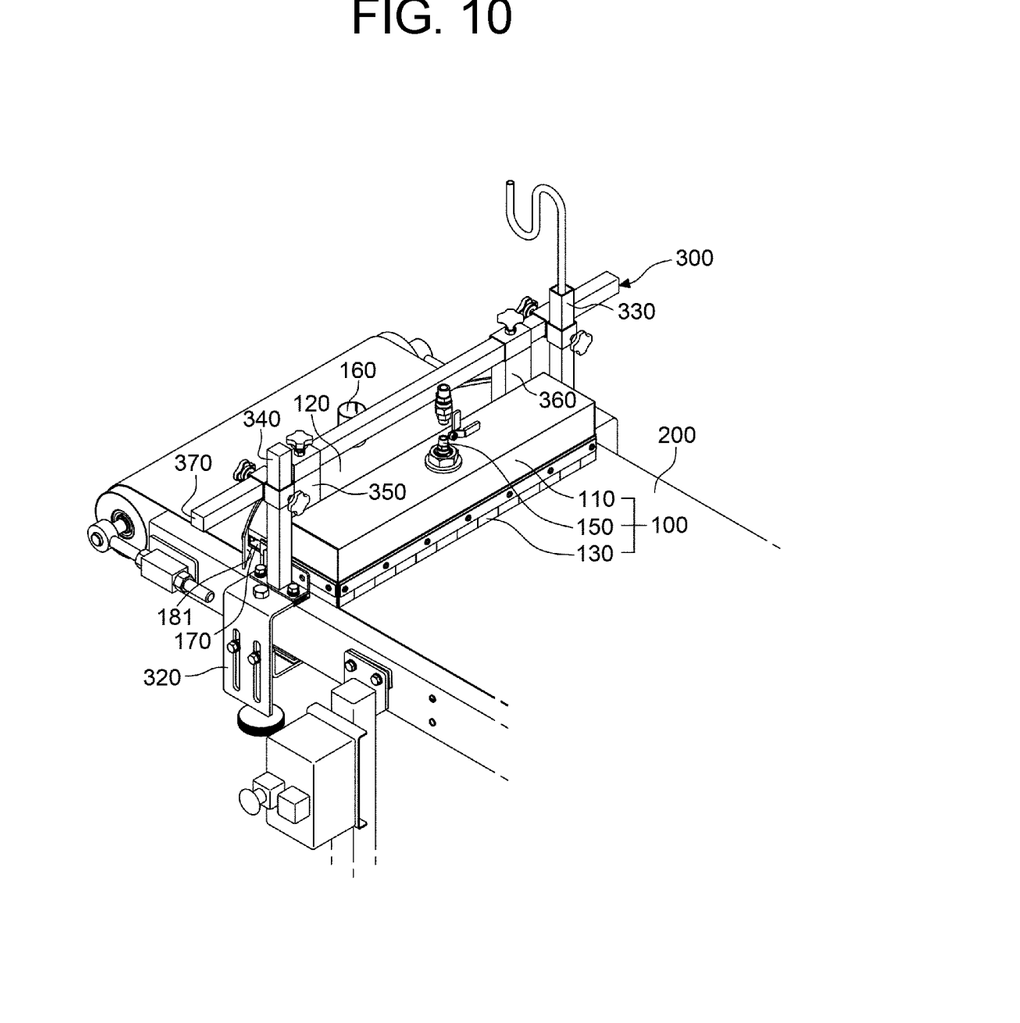

The support unit 300 includes a first apparatus fixing unit 310, a second apparatus fixing unit 320, a first support 330, a second support 340, a third support 350, a fourth support 360, and a fifth support 370, and specific positions thereof may be ascertained from FIGS. 9 and 10.

The first apparatus fixing unit 310 is positioned at one side of the conveyor belt 200 and may fix the cleaning apparatus 100 to a frame of the conveyor belt 200, and the second apparatus fixing unit 320 is positioned at the other side of the conveyor belt 200 and may fix the cleaning apparatus 100 to the frame of the conveyor belt 200.

The frame of the conveyor belt 200 means a frame formed to operate the conveyor belt 200, and the frame may be ascertained from the entire appearance in FIG. 8.

That is, one side of the first apparatus fixing unit 310 may be coupled to one side of the frame of the conveyor belt 200, the other side of the first apparatus fixing unit 310 may be coupled to one side of the cleaning apparatus 100, one side of the second apparatus fixing unit 320 may be coupled to the other side of the frame of the conveyor belt 200, and the other side of the second apparatus fixing unit 320 may be coupled to the other side of the cleaning apparatus 100 so that the cleaning apparatus 100 is fixed by installing the first and second apparatus fixing units 310 and 320 at both sides of the frame of the conveyor belt 200 and positioning the cleaning apparatus 100 between the first and second apparatus fixing units 310 and 320.

The first support 330 is positioned at one side of an upper side of the first apparatus fixing unit 310, and the second support 340 is positioned at one side of an upper side of the second apparatus fixing unit 320, such that the cleaning apparatus 100 is positioned between the first support 330 and the second support 340.

The third support 350 is connected to one side of the cleaning apparatus 100, and the fourth support 360 is connected to the other side of the cleaning apparatus 100. Particularly, the third support 350 is positioned at one side of an upper surface of the suction chamber unit 120, and the fourth support 360 is positioned at the other side of the upper surface of the suction chamber unit 120, such that the support 300 and the cleaning apparatus 100 may be connected to each other.

The fifth support 370 is elongated to be connected to the first support 330, the second support 340, the third support 350, and the fourth support 360, and the fifth support 370 is horizontally formed above the conveyor belt 200.

A height h3 of the cleaning apparatus 100 may be adjusted since the first and second supports 330 and 340 are formed, and a horizontal width w1 may be adjusted by the third, fourth, and fifth supports 350, 360, and 370, such that even though the width of the conveyor belt 200 is increased, the cleaning apparatus 100 may be installed on and used for the conveyor belts 200 having various sizes by adjusting the horizontal width w1 of the support unit 300.

While the exemplary embodiments of the present invention have been described as described above, the exemplary embodiments are just exemplary embodiments within the scope of the technical spirit of the present invention, and the present invention may be variously modified by those skilled in the art without departing from the technical spirit of the present invention.

What is claimed is:

1. A conveyor belt cleaning apparatus comprising:
   a steam chamber unit which is seated on a surface of a conveyor belt, has a predetermined internal space formed to receive steam introduced from the outside, and a portion which is opened and faces the surface of the conveyor belt;
   a suction chamber unit which is positioned at a rear side of the steam chamber unit, has a predetermined internal space, and has a portion which is opened and faces the surface of the conveyor belt;
   a foreign substance brush unit which is positioned at a front lower side of the steam chamber unit, has one end seated on the conveyor belt, and sweeps foreign substances off the conveyor belt;
   a partition wall which is positioned between the steam chamber unit and the suction chamber unit, and has a foreign substance passing portion formed at a lower end of the partition wall so that foreign substances introduced into the steam chamber unit are moved to the suction chamber unit;
   a steam injection port which is positioned at one side in the steam chamber unit in order to inject steam into an internal space of the steam chamber unit, and has one side that protrudes from a surface of the steam chamber unit;
   a foreign substance discharge unit which penetrates one side of the suction chamber unit, and discharges the foreign substances introduced into the internal space of the suction chamber unit; and
   air suction ports which are formed at both sides of the suction chamber unit based on a center of the foreign substance discharge unit so that air is introduced from the outside.

2. The conveyor belt cleaning apparatus of claim 1, further comprising:
   a pressing unit which is positioned at a rear side of the suction chamber unit, and has a squeegee formed at a portion that is in contact with the conveyor belt.

3. The conveyor belt cleaning apparatus of claim 1, wherein the steam injection port includes:
   a steam injection pipe which penetrates the steam chamber unit so that one side of the steam injection pipe is positioned outside the steam chamber unit and connected to a portion into which the steam is injected, and the other side of the steam injection pipe is positioned inside the steam chamber unit;
   a first connecting pipe which extends toward both sides from an end of the steam injection pipe positioned inside the steam chamber unit; and
   a second connecting pipe which is elongated to pass through one side end and the other side end of the first connecting pipe, and has multiple steam discharge ports formed in a direction toward the conveyor belt.

4. The conveyor belt cleaning apparatus of claim 2, wherein the steam injection port includes:
   a steam injection pipe which penetrates the steam chamber unit so that one side of the steam injection pipe is positioned outside the steam chamber unit and connected to a portion into which the steam is injected, and the other side of the steam injection pipe is positioned inside the steam chamber unit;

a first connecting pipe which extends toward both sides from an end of the steam injection pipe positioned inside the steam chamber unit; and a second connecting pipe which is elongated to pass through one side end and the other side end of the first connecting pipe, and has multiple steam discharge ports formed in a direction toward the conveyor belt.

\* \* \* \* \*